US012766729B2

(12) United States Patent
Matsuno

(10) Patent No.: US 12,766,729 B2
(45) Date of Patent: Oct. 20, 2026

(54) CALIBRATION APPARATUS, CALIBRATION SYSTEM, MOBILE SYSTEM, CALIBRATION METHOD, AND CONTROL PROGRAM

(71) Applicant: TOYOTA JIDOSHA KABUSHIKI KAISHA, Aichi-ken (JP)

(72) Inventor: Nobuyuki Matsuno, Tokyo-to (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 414 days.

(21) Appl. No.: 18/465,162

(22) Filed: Sep. 12, 2023

(65) Prior Publication Data

US 2024/0116186 A1 Apr. 11, 2024

(30) Foreign Application Priority Data

Oct. 7, 2022 (JP) ................................ 2022-162067

(51) Int. Cl.
*B25J 9/16* (2006.01)

(52) U.S. Cl.
CPC ............. *B25J 9/1692* (2013.01); *B25J 9/162* (2013.01); *B25J 9/1697* (2013.01)

(58) Field of Classification Search
CPC ........ B25J 9/1692; B25J 9/162; B25J 9/1697; B25J 9/1694; B25J 9/1602; B25J 9/1664; G01S 7/52004; G01S 17/931; G01S 7/4972
See application file for complete search history.

(56) References Cited

U.S. PATENT DOCUMENTS

| | | | | |
|---|---|---|---|---|
| 9,919,427 | B1 * | 3/2018 | Guilbert | B25J 9/1664 |
| 2016/0132059 | A1 * | 5/2016 | Mason | B25J 9/1664 701/28 |
| 2020/0023521 | A1 * | 1/2020 | Dan | B25J 9/1692 |
| 2020/0174107 | A1 * | 6/2020 | Briggs | G01S 17/86 |
| 2020/0406465 | A1 * | 12/2020 | Terasawa | B25J 13/02 |
| 2022/0326763 | A1 * | 10/2022 | Rekow | G01S 17/87 |
| 2023/0070281 | A1 * | 3/2023 | Melrose | B25J 9/1692 |

FOREIGN PATENT DOCUMENTS

| | | | | |
|---|---|---|---|---|
| JP | 2016-013608 A | | 1/2016 | |
| JP | 2020-011339 A | | 1/2020 | |
| JP | 2022-014992 A | | 1/2022 | |
| WO | 2019/146201 A1 | | 8/2019 | |
| WO | WO-2022222697 A1 | * | 10/2022 | B65G 1/04 |

* cited by examiner

*Primary Examiner* — Nhi Q Bui
(74) *Attorney, Agent, or Firm* — HAUPTMAN HAM, LLP

(57) ABSTRACT

A calibration apparatus calculates, from a result of detecting a first marker by a first sensor that is attached to a predetermined position on a mobile robot, a posture of the first marker relative to the first sensor; calculates, from a result of detecting a second marker by a second sensor that is attached to a position different from the predetermined position on the mobile robot, a posture of the second marker relative to the second sensor; and at least calculates the posture of the second sensor relative to the origin from the posture of the first sensor relative to the origin, the posture of the first marker relative to the first sensor, the posture of the second marker relative to the first marker, and the posture of the second marker relative to the second sensor.

12 Claims, 6 Drawing Sheets

CALIBRATION APPARATUS, CALIBRATION SYSTEM, MOBILE SYSTEM, CALIBRATION METHOD, AND CONTROL PROGRAM

CROSS REFERENCE TO RELATED APPLICATIONS

This application is based upon and claims the benefit of priority from Japanese patent application No. 2022-162067, filed on Oct. 7, 2022, the disclosure of which is incorporated herein in its entirety by reference.

BACKGROUND

The present disclosure relates to a calibration apparatus, a calibration system, a mobile system, a calibration method, and a control program.

In recent years, it has been required to accurately grasp a position of a sensor from an origin and a posture of this sensor, the sensor being attached to a mobile robot and detecting a target object such as a marker, in order to operate the mobile robot with a high accuracy. A related technique is disclosed, for example, in International Patent Publication No. WO 2019/146201.

International Patent Publication No. WO 2019/146201 discloses an information processing apparatus including a position computer that computes, on a basis of first positional information obtained from reading of a projected marker by a first visual sensor and second positional information including positional information obtained from reading of the marker by a second visual sensor that moves relative to the first visual sensor, a position of a movable unit on which the second visual sensor is disposed.

SUMMARY

With the information processing apparatus disclosed in International Patent Publication No. WO 2019/146201, if the first visual sensor and the second visual sensor are not attached to positions on the movable unit where they are capable of detecting a common marker at the same time, it is impossible to compute the position of the movable unit on which the second visual sensor is disposed. That is, there is a problem in related art that it is impossible to calibrate a calibration target sensor depending on the position on which the calibration target sensor (second visual sensor) is attached.

The present disclosure has been made in view of the aforementioned background and an aim of the present disclosure is to provide a calibration apparatus, a calibration system, a mobile system, a calibration method, and a control program capable of efficiently executing calibration of a sensor attached to a mobile robot.

A calibration apparatus according to the present disclosure executes the following processing of: calculating, from a result of detecting a first marker by a first sensor that is attached to a predetermined position on a mobile robot in such a way that a posture of the first sensor relative to an origin is at least known and is configured to be able to detect the first marker, a posture of the first marker relative to the first sensor; calculating, from a result of detecting a second marker by a second sensor that is attached to a position different from the predetermined position on the mobile robot and is configured to be able to detect a second marker whose posture relative to the first marker is at least known, a posture of the second marker relative to the second sensor; and at least calculating a posture of the second sensor relative to the origin from the posture of the first sensor relative to the origin, the posture of the first marker relative to the first sensor, the posture of the second marker relative to the first marker, and the posture of the second marker relative to the second sensor. In this calibration apparatus, the second sensor to be calibrated does not need to be provided on a position where it can detect a common marker at the same time the first sensor does, whereby the second sensor to be calibrated may be calibrated regardless of the position on which the second sensor is attached. That is, this calibration apparatus allows calibration of a sensor attached to a mobile robot to be efficiently executed.

A position of the second marker relative to the first marker may be further known, the first sensor may be attached to the predetermined position on the mobile robot in such a way that the position of the first sensor relative to the origin is further known, the calibration apparatus may calculate a position and a posture of the first marker relative to the first sensor from a result of detecting the first marker by the first sensor, the calibration apparatus may calculate a position and a posture of the second marker relative to the second sensor from a result of detecting the second marker by the second sensor, and the calibration apparatus may calculate a position and a posture of the second sensor relative to the origin from the position and the posture of the first sensor relative to the origin, the position and the posture of the first marker relative to the first sensor, the position and the posture of the second marker relative to the first marker, and the position and the posture of the second marker relative to the second sensor.

The first marker may be any one of a leg, a site of a predetermined shape, and a site of a predetermined pattern of a marker stand to which the second marker is attached.

The first marker may be a desired area of a principal surface of a planar member, the second marker being attached to the principal surface of the planar member.

The first sensor may be Light Detection And Ranging (LiDAR) configured to be able to detect the shape of the first marker.

A calibration system according to the present disclosure includes: the calibration apparatus according to any one of the aforementioned ones; the first sensor and the second sensor; and the first marker and the second marker. In this calibration system, the second sensor to be calibrated does not need to be provided on a position where it can detect a common marker at the same time the first sensor does, whereby the second sensor to be calibrated may be calibrated regardless of the position on which the second sensor is attached. That is, this calibration system allows calibration of a sensor attached to a mobile robot to be efficiently executed.

A mobile system according to the present disclosure includes: the mobile robot; the calibration apparatus according to any one of the aforementioned ones; the first sensor and the second sensor; and the first marker and the second marker. In this mobile system, the second sensor to be calibrated does not need to be provided on a position where it can detect a common marker at the same time the first sensor does, whereby the second sensor to be calibrated may be calibrated regardless of the position on which the second sensor is attached. That is, this mobile system allows calibration of a sensor attached to a mobile robot to be efficiently executed.

A calibration method according to the present disclosure is a calibration method by a calibration apparatus, the calibration method including: calculating, from a result of detecting a first marker by a first sensor that is attached to a predetermined position on a mobile robot in such a way that a posture of the first sensor relative to an origin is at least known and is configured to be able to detect the first marker, a posture of the first marker relative to the first sensor; calculating, from a result of detecting a second marker by a second sensor that is attached to a position different from the predetermined position on the mobile robot and is configured to be able to detect a second marker whose posture relative to the first marker is at least known, a posture of the second marker relative to the second sensor; and at least calculating a posture of the second sensor relative to the origin from the posture of the first sensor relative to the origin, the posture of the first marker relative to the first sensor, the posture of the second marker relative to the first marker, and the posture of the second marker relative to the second sensor. In this calibration method, the second sensor to be calibrated does not need to be provided on a position where it can detect a common marker at the same time the first sensor does, whereby the second sensor to be calibrated may be calibrated regardless of the position on which the second sensor is attached. That is, this calibration method allows calibration of a sensor attached to a mobile robot to be efficiently executed.

A position of the second marker relative to the first marker may be further known, the first sensor may be attached to the predetermined position on the mobile robot in such a way that the position of the first sensor relative to the origin is further known, in the calibration method by the calibration apparatus, a position and a posture of the first marker relative to the first sensor may be calculated from a result of detecting the first marker by the first sensor, a position and a posture of the second marker relative to the second sensor may be calculated from a result of detecting the second marker by the second sensor, and a position and a posture of the second sensor relative to the origin may be calculated from the position and the posture of the first sensor relative to the origin, the position and the posture of the first marker relative to the first sensor, the position and the posture of the second marker relative to the first marker, and the position and the posture of the second marker relative to the second sensor.

A control program according to the present disclosure is a control program for causing a computer to execute calibration processing performed by a calibration apparatus, the control program causing the computer to execute: processing for calculating, from a result of detecting a first marker by a first sensor that is attached to a predetermined position on a mobile robot in such a way that a posture of the first sensor relative to an origin is at least known and is configured to be able to detect the first marker, a posture of the first marker relative to the first sensor; processing for calculating, from a result of detecting a second marker by a second sensor that is attached to a position different from the predetermined position on the mobile robot and is configured to be able to detect a second marker whose posture relative to the first marker is at least known, a posture of the second marker relative to the second sensor; and processing for at least calculating a posture of the second sensor relative to the origin from the posture of the first sensor relative to the origin, the posture of the first marker relative to the first sensor, the posture of the second marker relative to the first marker, and the posture of the second marker relative to the second sensor. In this control program, the second sensor to be calibrated does not need to be provided on a position where it can detect a common marker at the same time the first sensor does, whereby the second sensor to be calibrated may be calibrated regardless of the position on which the second sensor is attached. That is, this control program allows calibration of a sensor attached to a mobile robot to be efficiently executed.

A position of the second marker relative to the first marker may be further known, the first sensor may be attached to the predetermined position on the mobile robot in such a way that the position of the first sensor relative to the origin is further known, and the control program may cause a computer to execute: processing for calculating a position and a posture of the first marker relative to the first sensor from a result of detecting the first marker by the first sensor; processing for calculating a position and a posture of the second marker relative to the second sensor from a result of detecting the second marker by the second sensor; and processing for calculating a position and a posture of the second sensor relative to the origin from the position and the posture of the first sensor relative to the origin, the position and the posture of the first marker relative to the first sensor, the position and the posture of the second marker relative to the first marker, and the position and the posture of the second marker relative to the second sensor.

According to the present disclosure, it is possible to provide a calibration apparatus, a calibration system, a mobile system, a calibration method, and a control program capable of efficiently executing calibration of a sensor attached to a mobile robot.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be explained with reference to embodiments of the present disclosure. However, the disclosure set forth in the claims is not limited to the following embodiments. Further, not all the structures explained in the embodiments may be necessary as means for solving the problem. For a purpose of clarifying the description, the following description and the drawings will be omitted and simplified as appropriate. Throughout the drawings, the same components are denoted by the same reference symbols and overlapping descriptions will be omitted as necessary.

First Embodiment

Figure 1:
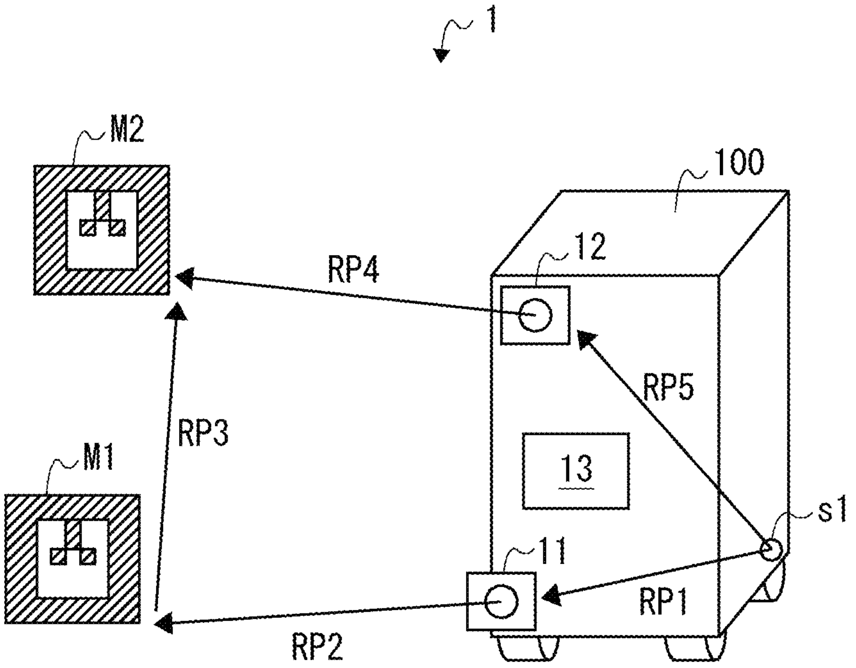
FIG. 1 is a diagram showing a configuration example of a mobile system according to a first embodiment.

FIG. 1 is a diagram showing a configuration example of a mobile system 1 according to a first embodiment. In the mobile system 1 according to this embodiment, since a second sensor to be calibrated does not need to be provided on a position where it can detect a common marker at the same time the first sensor does, a calibration apparatus applied to a mobile robot is able to calibrate the second sensor regardless of the position on which the second sensor to be calibrated is attached. That is, this calibration apparatus allows calibration of a sensor attached to a mobile robot to be efficiently executed. A more specific description will be given in the following.

As shown in FIG. 1, the mobile system 1 include a mobile robot 100, a marker (first marker) M1, and a marker (second marker) M2. A sensor (first sensor) 11, a sensor (second sensor) 12, and a calibration apparatus 13 are provided in the mobile robot 100. The calibration apparatus 13 includes, for example, an arithmetic processing apparatus. Note that the markers M1 and M2, the sensors 11 and 12, and the calibration apparatus 13 form a calibration system.

The mobile robot 100 is an autonomously movable robot. The mobile robot 100 grasps the position and the orientation thereof based on the result of detection by each of the sensors 11 and 12.

The sensor 11 is configured to be able to detect the marker M1. The sensor 11 is, for example, one of an RGB camera, a motion capture camera, a thermal camera, a shape acquisition sensor such as LiDAR or sonar, and a light-receiving element that is capable of detecting the marker M1. LiDAR is an abbreviation for Light Detection And Ranging.

The sensor 12 is configured to be able to detect the marker M2. For example, the sensor 12 is one of an RGB camera, a motion capture camera, a thermal camera, a shape acquisition sensor such as LiDAR or sonar, and a light-receiving element that is capable of detecting the marker M2.

The sensor 11 is attached to a predetermined position on the mobile robot 100 so that a position and a posture RP1 of the sensor 11 relative to an origin s1 of the mobile robot 100 are known. That is, information regarding the position and the posture RP1 of the sensor 11 relative to the origin s1 of the mobile robot 100 are acquired by the calibration apparatus 13 in advance. On the other hand, the sensor 12 is attached in a state where a position and a posture RP5 of the sensor 12 relative to the origin s1 of the mobile robot 100 are unknown. The sensor 12 is a calibration target sensor whose position and posture are calibrated by the calibration apparatus 13.

Each of the markers M1 and M2 is, for example, one of a calibration board that can be detected by an RGB camera, a calibration wand that can be detected by a motion capture camera, a metallic calibration board that can be detected by a thermal camera, an object having a predetermined shape that can be detected by a shape acquisition sensor, and a light-emitting element emitting a light that can be received by a light-receiving element. In this embodiment, a case where both the markers M1 and M2 are calibration boards having a predetermined pattern and both the sensors 11 and 12 are RGB cameras will be described as an example.

Here, the marker M2 is disposed in such a way that a position and a posture RP3 of the marker M2 relative to the marker M1 are known. That is, the information regarding the relative positions and the relative postures of the markers M1 and M2 is acquired by the calibration apparatus 13 in advance. The markers M1 and M2 are attached, for example, onto one principal surface of a planar member, whereby the relative postures of the markers M1 and M2 can be easily recognized.

The calibration apparatus 13 calculates the position and the posture RP5 of the sensor 12 relative to the origin s1 of the mobile robot 100 using, for example, an arithmetic processing apparatus. More specifically, the calibration apparatus 13 first calculates a position and a posture RP2 of the marker M1 relative to the sensor 11 from the result of the detection by the sensor 11. Further, the calibration apparatus 13 calculates a position and a posture RP4 of the marker M2 relative to the sensor 12 from the result of the detection by the sensor 12. Then, the calibration apparatus 13 calculates the position and the posture RP5 of the sensor 12 relative to the origin s1 from the position and the posture RP1 of the sensor 11 relative to the origin s1, the position and the posture RP2 of the marker M1 relative to the sensor 11, the position and the posture RP3 of the marker M2 relative to the marker M1, and the position and the posture RP4 of the marker M2 relative to the sensor 12.

Accordingly, the mobile system 1 according to this embodiment and the calibration apparatus 13 used therein are able to calibrate the position and the posture of the sensor 12 to be calibrated even in a case where the sensor 12 is not disposed on a position where it can detect the marker M1 at the same time the sensor 11 does. That is, the mobile system 1 according to this embodiment and the calibration apparatus 13 used therein are able to efficiently calibrate the position and the posture of the sensor 12 attached to the mobile robot 100.

(Modified Example of Mobile System 1)

Figure 2:
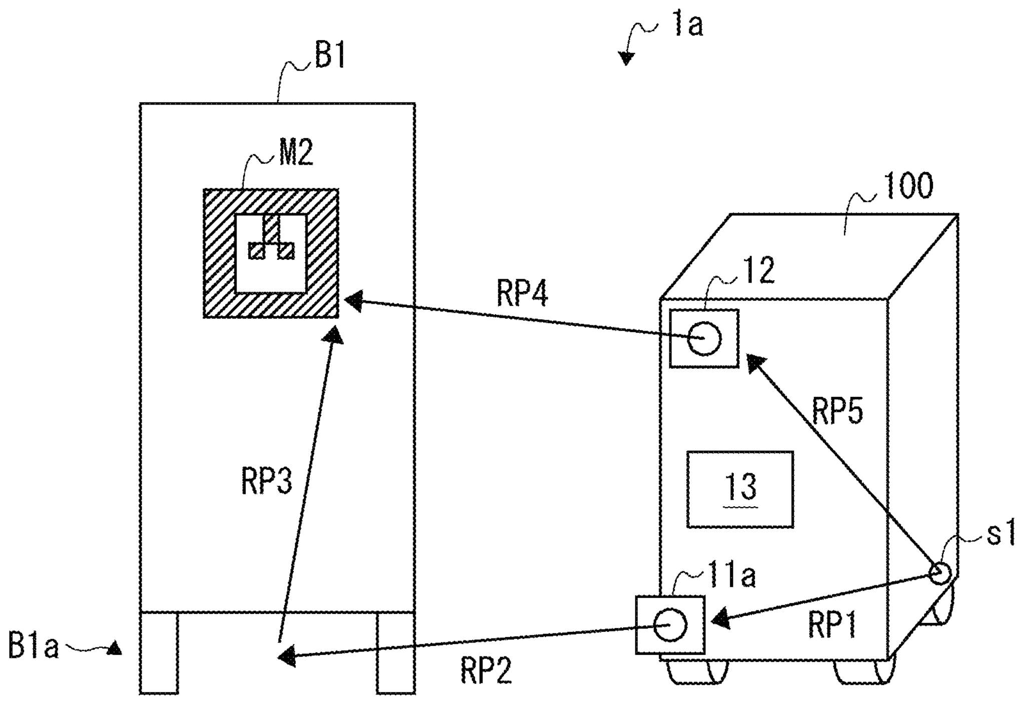
FIG. 2 is a diagram showing a modified example of the mobile system shown in FIG. 1.

FIG. 2 is a diagram showing a mobile system 1*a*, which is a modified example of the mobile system 1. The mobile system 1*a* is different from the mobile system 1 in that a sensor 11*a* is provided in the mobile system 1*a* instead of the sensor 11. The sensor 11*a* is LiDAR, which is a kind of a shape acquisition sensor. The sensor 11*a* is attached to a predetermined position on a mobile robot 100 so that a position and a posture RP1 of the sensor 11*a* relative to an origin s1 of the mobile robot 100 is known, just like the case where the sensor 11 is used.

Further, in the mobile system 1*a*, a marker M2 is attached to a marker stand B1. The sensor 11*a*, which is LiDAR, detects the shape of a leg B1*a* of the marker stand B1 as a marker M1.

The marker M2 is attached to the marker stand B1 so that a position and a posture RP3 of the marker M2 relative to the leg B1*a* of the marker stand B1 are known. That is, information regarding relative positions and relative postures of the marker M2 and the leg B1*a* of the marker stand B1 is acquired by a calibration apparatus 13 in advance.

The calibration apparatus 13 calculates a position and a posture RP5 of a sensor 12 relative to the origin s1 of the mobile robot 100 using, for example, an arithmetic processing apparatus. More specifically, the calibration apparatus 13 first calculates a position and a posture RP2 of the leg B1*a* of the marker stand B1 relative to the sensor 11*a* from the result of the detection by the sensor 11*a*. Further, the calibration apparatus 13 calculates a position and a posture RP4 of the marker M2 relative to the sensor 12 from the result of the detection by the sensor 12. Then, the calibration apparatus 13 calculates the position and the posture RP5 of the sensor 12 relative to the origin s1 from the position and the posture RP1 of the sensor 11*a* relative to the origin s1, the position and the posture RP2 of the leg B1*a* of the marker stand B1 relative to the sensor 11*a*, the position and the posture RP3 of the marker M2 relative to the leg B1*a* of the marker stand B1, and the position and the posture RP4 of the marker M2 relative to the sensor 12.

Accordingly, the mobile system 1*a* is able to provide effects similar to those provided in the mobile system 1. While a case where the sensor 11*a*, which is LiDAR, detects the shape of the leg B1*a* of the marker stand B1 as the marker M1 has been described in this embodiment, this is merely an example. For example, the sensor 11*a* may detect a shape or a pattern of a predetermined part of the marker stand B1 other than the leg B1*a* thereof as the marker M1. Further, a reflective tape may be attached to a predetermined area of the marker stand B1 detected by the sensor 11*a*. Accordingly, it becomes easy for the sensor 11*a* to detect the predetermined area of the marker stand B1.

Second Embodiment

Figure 3:
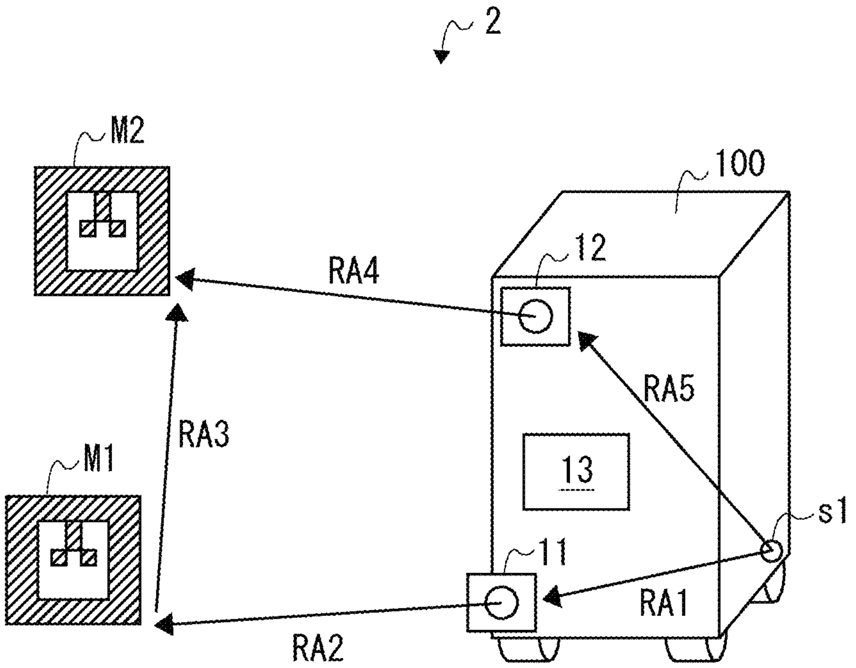
FIG. 3 is a diagram showing a configuration example of a mobile system according to a second embodiment.

FIG. 3 is a diagram showing a configuration example of a mobile system 2 according to a second embodiment. In the mobile system 2, the position of a sensor 12 is not calibrated, and only the posture of the sensor 12 is calibrated. Of the position and the posture of the sensor 12, only the posture is calibrated in a case, for example, where it is not required to detect a highly precise position on which the sensor 12 is attached or a case where the posture of the sensor 12 may vary in a state in which the position of the sensor 12 is fixed as a result of the sensor 12 being attached to a joint part. The posture of the sensor 12 indicates angles of roll, pitch, and yaw of the sensor 12 relative to an origin s1 of the mobile robot 100.

In this embodiment, a sensor 11 is attached to a predetermined position on a mobile robot 100 in such a way that a posture RA1 of the sensor 11 relative to the origin s1 of the mobile robot 100 is known. That is, the information regarding the posture RA1 of the sensor 11 relative to the origin s1 of the mobile robot 100 is acquired by a calibration apparatus 13 in advance. On the other hand, the sensor 12 is attached in a state in which a posture RA5 of the sensor 12 relative to the origin s1 of the mobile robot 100 is unknown. The sensor 12 is a calibration target sensor whose posture is calibrated by the calibration apparatus 13.

Further, a marker M2 is installed in such a way that a posture RA3 of the marker M2 relative to a marker M1 is known. That is, information regarding relative postures of the markers M1 and M2 is acquired by the calibration apparatus 13 in advance. Note that the markers M1 and M2 are attached, for example, onto one principal surface of a planar member, and thereby the relative postures of the markers M1 and M2 can be easily recognized.

The calibration apparatus 13 calculates the posture RA5 of the sensor 12 relative to the origin s1 of the mobile robot 100 using, for example, an arithmetic processing apparatus. More specifically, the calibration apparatus 13 first calculates a posture RA2 of the marker M1 relative to the sensor 11 from the result of the detection by the sensor 11. Further, the calibration apparatus 13 calculates a posture RA4 of the marker M2 relative to the sensor 12 from the result of the detection by the sensor 12. Then, the calibration apparatus 13 calculates the posture RA5 of the sensor 12 relative to the origin s1 from the posture RA1 of the sensor 11 relative to the origin s1, a posture RA2 of the marker M1 relative to the sensor 11, the posture RA3 of the marker M2 relative to the marker M1, and a posture RA4 of the marker M2 relative to the sensor 12.

Accordingly, the mobile system 2 according to this embodiment and the calibration apparatus 13 used therein are able to calibrate the posture of the sensor 12 to be calibrated even in a case where the sensor 12 is not disposed on a position where it can detect the marker M1 at the same time the sensor 11 does. That is, the mobile system 2 according to this embodiment and the calibration apparatus 13 used therein are able to efficiently calibrate the posture of the sensor 12 attached to the mobile robot 100.

(First Modified Example of Mobile System 2)

Figure 4:
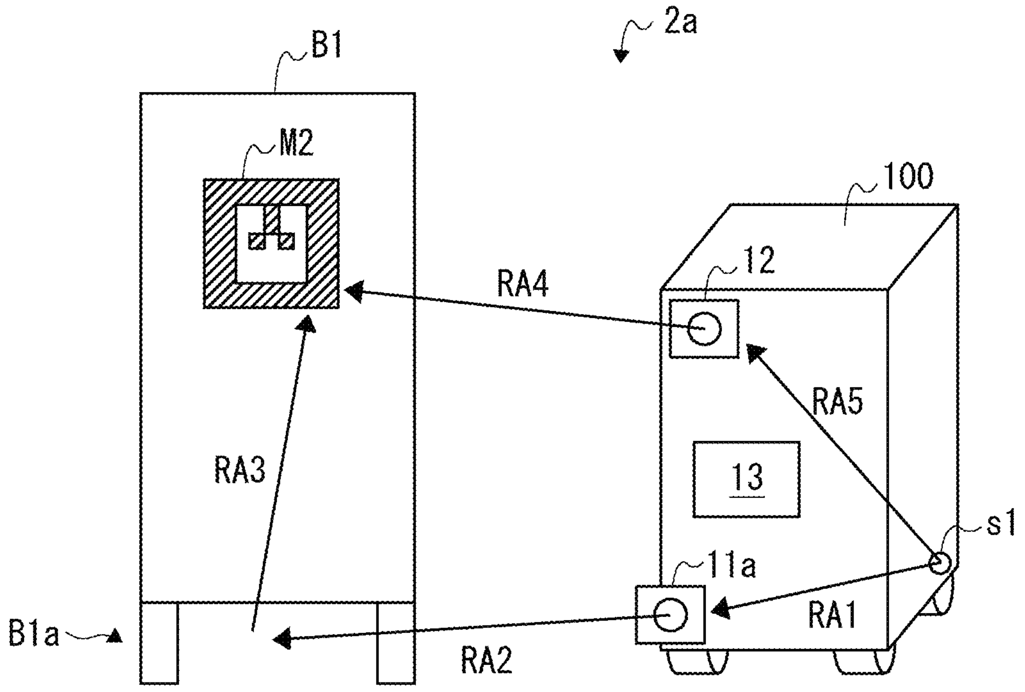
FIG. 4 is a diagram showing a first modified example of the mobile system shown in FIG. 3.

FIG. 4 is a diagram showing a mobile system 2*a*, which is a first modified example of the mobile system 2. The mobile system 2*a* is different from the mobile system 2 in that a sensor 11*a* is provided in the mobile system 2*a* instead of the sensor 11. The sensor 11*a* is LiDAR, which is a kind of a shape acquisition sensor. The sensor 11*a* is attached to a predetermined position on a mobile robot 100 in such a way that a posture RA1 of the sensor 11*a* relative to an origin s1 of the mobile robot 100 is known, just like the case where the sensor 11 is used.

Further, in the mobile system 2*a*, a marker M2 is attached to a marker stand B1. The sensor 11*a*, which is LiDAR, detects the shape of a leg B1*a* of the marker stand B1 as a marker M1.

Here, the marker M2 is attached to the marker stand B1 in such a way that a posture RA3 of the marker M2 relative to the leg B1*a* of the marker stand B1 is known. That is, information regarding relative postures of the marker M2 and the leg B1*a* of the marker stand B1 is acquired by the calibration apparatus 13 in advance.

The calibration apparatus 13 calculates a posture RA5 of a sensor 12 relative to the origin s1 of the mobile robot 100 using, for example, an arithmetic processing apparatus. More specifically, the calibration apparatus 13 first calculates a posture RA2 of the leg B1*a* of the marker stand B1 relative to the sensor 11*a* from the result of the detection by the sensor 11*a*. Further, a calibration apparatus 13 first calculates a posture RA4 of the marker M2 relative to the sensor 12 from the result of the detection by the sensor 12. Then, the calibration apparatus 13 calculates the posture RA5 of the sensor 12 relative to the origin s1 from a posture RA1 of the sensor 11*a* relative to the origin s1, the posture RA2 of the leg B1*a* of the marker stand B1 relative to the sensor 11*a*, a posture RA3 of the marker M2 relative to the leg B1*a* of the marker stand B1, and the posture RA4 of the marker M2 relative to the sensor 12.

Accordingly, the mobile system 2*a* is able to provide effects similar to those provided by the mobile system 2. While a case where the sensor 11*a*, which is LiDAR, detects the shape of the leg B1*a* of the marker stand B1 as the marker M1 has been described in this embodiment, this is merely an example. For example, the sensor 11*a* may detect the shape of a predetermined part of the marker stand B1 other than the leg B1*a* as the marker M1. Further, a reflective tape may be attached to the predetermined area of the marker stand B1 detected by the sensor 11*a*. Accordingly, it becomes easy for the sensor 11*a* to detect the predetermined area of the marker stand B1.

(Second Modified Example of Mobile System 2)

Figure 5:
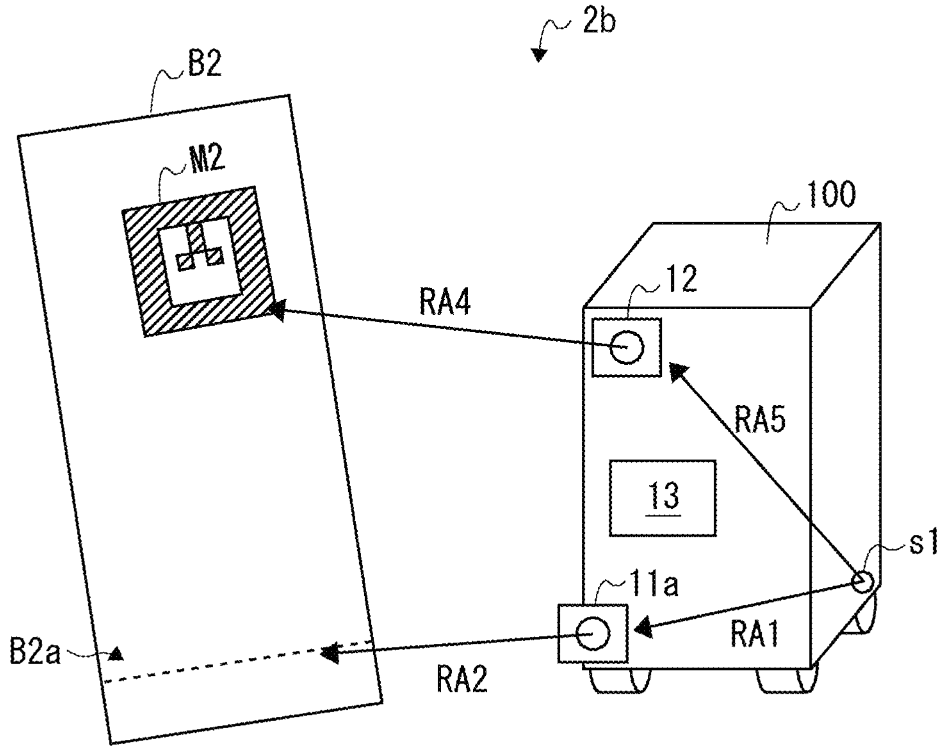
FIG. 5 is a diagram showing a second modified example of the mobile system shown in FIG. 3.

FIG. 5 is a diagram showing a mobile system 2*b*, which is a second modified example of the mobile system 2. The mobile system 2*b* is different from the mobile system 2*a* in that a marker M2 is attached to a principal surface of a planar member B2 such as a whiteboard or a wall of a room. A sensor 11*a*, which is LiDAR, detects the shape of a desired area B2*a* of the principal surface of the planar member B2 (tilt of the principal surface of the planar member B2) as a marker M1.

Here, since the marker M2 is attached to the principal surface of the planar member B2, the orientation (posture) of the marker M2 is the same as the orientation (posture) of the principal surface of the planar member B2. Therefore, it can be said that the posture of the marker M2 is the same as the posture of the principal surface of the planar member B2 (corresponding to the marker M1).

A calibration apparatus 13 calculates a posture RA5 of a sensor 12 relative to an origin s1 of a mobile robot 100 using, for example, an arithmetic processing apparatus. More specifically, the calibration apparatus 13 first calculates a posture (orientation) RA2 of the area B2*a* of the principal surface of the planar member B2 relative to the sensor 11*a* from the result of the detection by the sensor 11*a*. Further, the calibration apparatus 13 calculates a posture RA4 of the marker M2 relative to the sensor 12 from the result of the detection by the sensor 12. Then, the calibration apparatus 13 calculates the posture RA5 of the sensor 12 relative to the origin s1 from a posture RA1 of the sensor 11*a* relative to the origin s1, the posture (orientation) RA2 of the area B2*a* of the principal surface of the planar member B2 relative to the sensor 11*a*, a posture RA3 of the marker M2 relative to the leg B1*a* of the marker stand B1, and the posture RA4 of the marker M2 relative to the sensor 12. Accordingly, the mobile system 2*b* is able to provide effects similar to those provided in the mobile systems 2 and 2*a*.

(Third Modified Example of Mobile System 2)

Figure 6:
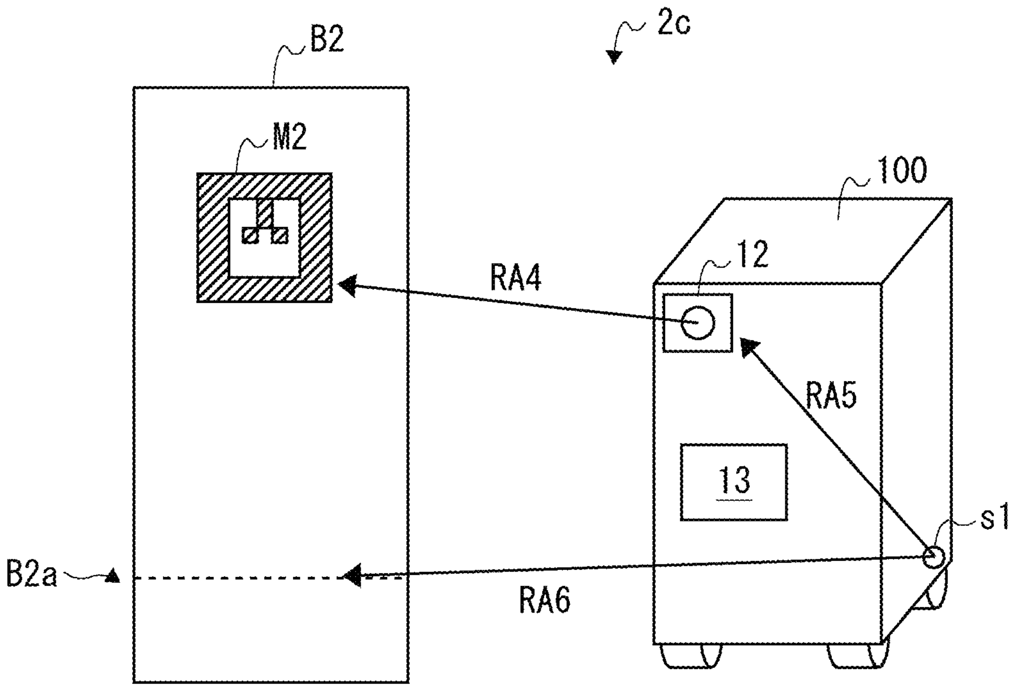
FIG. 6 is a diagram showing a third modified example of the mobile system shown in FIG. 3.

FIG. 6 is a diagram showing a mobile system 2*c*, which is a third modified example of the mobile system 2.

In the mobile system 2*c*, at the time of calibration, a mobile robot 100 moves, for example, in such a way that the mobile robot 100 and a planar member B2 are opposed to each other. Accordingly, an orientation (posture) RA6 of an origin s1 of the mobile robot 100 and a desired area B2*a* of a principal surface of the planar member B2 are known. Therefore, it is not necessary to provide the sensor 11*a*.

As described above, since a marker M2 is attached to the principal surface of the planar member B2, the orientation (posture) of the marker M2 is the same as the orientation (posture) of the principal surface of the planar member B2. Therefore, it can be said that that the posture of the marker M2 and the posture of the principal surface of the planar member B2 (corresponding to a marker M1) are known.

A calibration apparatus 13 calculates a posture RA5 of a sensor 12 relative to the origin s1 of the mobile robot 100 using, for example, an arithmetic processing apparatus. More specifically, the calibration apparatus 13 first calculates a posture RA4 of the marker M2 relative to the sensor 12 from the result of the detection by the sensor 12. Then, the calibration apparatus 13 calculates the posture RA5 of the sensor 12 relative to the origin s1 from the posture RA6 of the area B2*a* of the principal surface of the planar member B2 relative to the origin s1 and the posture RA4 of the marker M2 relative to the sensor 12. Accordingly, the mobile system 2*c* is able to provide effects similar to those provided in the mobile systems 2, 2*a*, and 2*b*.

As described above, the mobile system according to the above-described first and second embodiments and the calibration apparatus used therein are able to execute calibration of the second sensor to be calibrated even in a case where the second sensor attached to the mobile robot is not disposed on a position where it can detect a common marker at the same time the first sensor does. That is, the mobile system according to the above-described first and second embodiments and the calibration apparatus used therein are able to efficiently execute calibration of the second sensor attached to the mobile robot.

Note that the present disclosure is not limited to the above-described embodiments and may be changed as appropriate without departing from the spirit of the present disclosure.

Further, the present disclosure is able to implement a part or the whole of the control processing in the calibration apparatus 13 by causing a Central Processing Unit (CPU) to execute a computer program.

The aforementioned program includes instructions (or software codes) that, when loaded into a computer, cause the computer to perform one or more of the functions described in the embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

The whole or part of the embodiments described above can be described as, but not limited to, the following supplementary notes.

(Supplementary Note 1)

A calibration method of a mobile system comprising:
- a mobile robot;
- a marker attached onto a principal surface of a planar member; and
- a sensor that is attached to the mobile robot and is configured to be able to detect the marker; and
- a calibration apparatus, wherein
- the mobile robot is disposed in such a way that the principal surface of the planar member and the mobile robot are opposed to each other,
- the marker is detected by the sensor,
- a posture of the marker relative to the sensor is calculated from a result of detecting the marker by the sensor using the calibration apparatus, and
- the posture of the sensor relative to the origin is calculated using the calibration apparatus based on the calculated posture of the marker relative to the sensor, and the posture of the marker relative to an origin of the mobile robot, the posture of the marker being determined by installing the mobile robot in such a way that the principal surface of the planar member and the mobile robot are opposed to each other.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A calibration apparatus configured for executing processing of:
- calculating, from a result of detecting a first marker by a first sensor that is attached to a predetermined position on a mobile robot in such a way that a posture of the first sensor relative to an origin is at least known and is configured to detect the first marker, a posture of the first marker relative to the first sensor;
- calculating, from a result of detecting a second marker that is distinct from the first marker by a second sensor that is attached to a position different from the predetermined position on the mobile robot and is configured to detect the second marker whose posture relative to the first marker is at least known, a posture of the second marker relative to the second sensor; and at least calculating a posture of the second sensor relative to the origin from the posture of the first sensor relative to the origin, the posture of the first marker relative to the first sensor, the posture of the second marker relative to the first marker, and the posture of the second marker relative to the second sensor.

2. The calibration apparatus according to claim 1, wherein a position of the second marker relative to the first marker is further known, the first sensor is attached to the predetermined position on the mobile robot in such a way that the position of the first sensor relative to the origin is further known, the calibration apparatus is configured to calculate a position and a posture of the first marker relative to the first sensor from a result of detecting the first marker by the first sensor, the calibration apparatus is configured to calculate a position and a posture of the second marker relative to the second sensor from a result of detecting the second marker by the second sensor, and the calibration apparatus is configured to calculate a position and a posture of the second sensor relative to the origin from the position and the posture of the first sensor relative to the origin, the position and the posture of the first marker relative to the first sensor, the position and the posture of the second marker relative to the first marker, and the position and the posture of the second marker relative to the second sensor.

3. The calibration apparatus according to claim 1, wherein the first marker is any one of a leg, a site of a predetermined shape, or a site of a predetermined pattern of a marker stand to which the second marker is attached.

4. The calibration apparatus according to claim 1, wherein the first marker is a desired area of a principal surface of a planar member, the second marker being attached to the principal surface of the planar member.

5. The calibration apparatus according to claim 1, wherein the first sensor is Light Detection And Ranging (LiDAR) configured to detect a shape of the first marker.

6. A calibration system, comprising:

the calibration apparatus according to claim 1;

the first sensor and the second sensor; and the first marker and the second marker.

7. A mobile system, comprising:

the mobile robot;

the calibration apparatus according to claim 1;

the first sensor and the second sensor; and the first marker and the second marker.

8. A calibration method by a calibration apparatus, the calibration method comprising:

calculating, from a result of detecting a first marker by a first sensor that is attached to a predetermined position on a mobile robot in such a way that a posture of the first sensor relative to an origin is at least known and is configured to detect the first marker, a posture of the first marker relative to the first sensor;

calculating, from a result of detecting a second marker that is distinct from the first marker by a second sensor that is attached to a position different from the predetermined position on the mobile robot and is configured to detect the second marker whose posture relative to the first marker is at least known, a posture of the second marker relative to the second sensor; and at least calculating a posture of the second sensor relative to the origin from the posture of the first sensor relative to the origin, the posture of the first marker relative to the first sensor, the posture of the second marker relative to the first marker, and the posture of the second marker relative to the second sensor.

9. The calibration method according to claim 8, wherein a position of the second marker relative to the first marker is further known, the first sensor is attached to the predetermined position on the mobile robot in such a way that the position of the first sensor relative to the origin is further known, in the calibration method by the calibration apparatus, a position and a posture of the first marker relative to the first sensor are calculated from a result of detecting the first marker by the first sensor, a position and a posture of the second marker relative to the second sensor are calculated from a result of detecting the second marker by the second sensor, and a position and a posture of the second sensor relative to the origin are calculated from the position and the posture of the first sensor relative to the origin, the position and the posture of the first marker relative to the first sensor, the position and the posture of the second marker relative to the first marker, and the position and the posture of the second marker relative to the second sensor.

10. A non-transitory computer readable storage medium storing a control program for causing a computer to execute calibration processing performed by a calibration apparatus, the control program causing the computer to execute:

processing for calculating, from a result of detecting a first marker by a first sensor that is attached to a predetermined position on a mobile robot in such a way that a posture of the first sensor relative to an origin is at least known and is configured to detect the first marker, a posture of the first marker relative to the first sensor;

processing for calculating, from a result of detecting a second marker that is distinct from the first marker by a second sensor that is attached to a position different from the predetermined position on the mobile robot and is configured to detect the second marker whose posture relative to the first marker is at least known, a posture of the second marker relative to the second sensor; and processing for at least calculating a posture of the second sensor relative to the origin from the posture of the first sensor relative to the origin, the posture of the first marker relative to the first sensor, the posture of the second marker relative to the first marker, and the posture of the second marker relative to the second sensor.

11. The non-transitory computer readable storage medium storing the control program according to claim 10, wherein a position of the second marker relative to the first marker is further known, the first sensor is attached to the predetermined position on the mobile robot in such a way that the position of the first sensor relative to the origin is further known, and the control program causes the computer to execute:

processing for calculating a position and a posture of the first marker relative to the first sensor from a result of detecting the first marker by the first sensor;

processing for calculating a position and a posture of the second marker relative to the second sensor from a result of detecting the second marker by the second sensor; and processing for calculating a position and a posture of the second sensor relative to the origin from the position and the posture of the first sensor relative to the origin, the position and the posture of the first marker relative to the first sensor, the position and the posture of the second marker relative to the first marker, and the position and the posture of the second marker relative to the second sensor.

12. The calibration apparatus according to claim 1, wherein the mobile robot is an autonomously movable robot configured to grasp a position and an orientation thereof based on a result of detection by each of the first and second sensors.

* * * * *